June 8, 1954  E. C. BROGE ET AL  2,680,721
PROCESS OF INCREASING THE SIZE OF UNAGGREGATED SILICA
PARTICLES IN AN AQUEOUS SILICA SUSPENSION
Filed March 20, 1952
*Fig.1.*  *Fig.2.*  *Fig.3.*
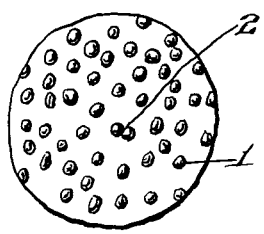 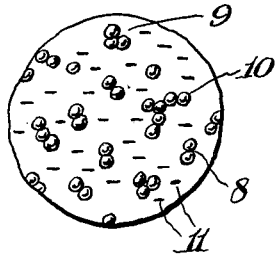 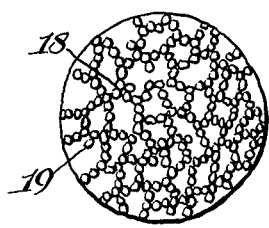
  
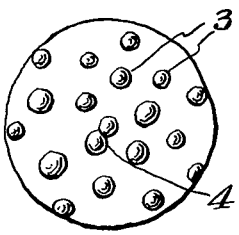 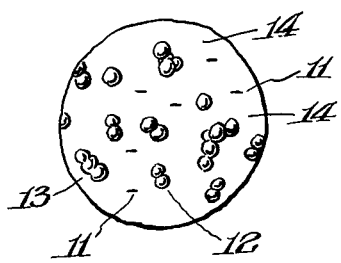 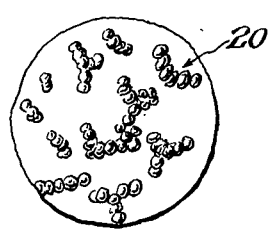
  
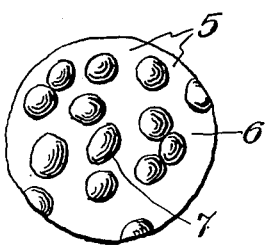 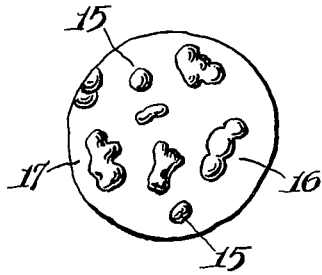 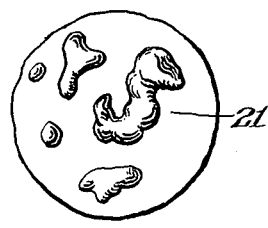
INVENTORS:
Edward C. Broge
BY and Ralph K. Iler
Albert B. Griggs
Fred C. Carlson
ATTORNEYS Patented June 8, 1954

2,680,721

UNITED STATES PATENT OFFICE 2,680,721

PROCESS OF INCREASING THE SIZE OF UN-AGGREGATED SILICA PARTICLES IN AN AQUEOUS SILICA SUSPENSION

Edward C. Broge, Cecil County, Md., and Ralph K. Iler, Brandywine Hundred, Del., assignors to E. I. du Pont de Nemours and Company, Wilmington, Del., a corporation of Delaware Application March 20, 1952, Serial No. 277,673

5 Claims. (Cl. 252—313)

This invention is directed to the preparation of silica suspensions and is more particularly directed to processes for making silica suspensions of larger particles from aqueous silica sols of unaggregated, spheroidal particles of amorphous silica substantially free from particles having a diameter less than 5 millimicrons. The invention is more specifically directed to the preparation of silica sols of dense, amorphous and unaggregated spheroidal particles, and also to the preparation of suspensions of crystalline particles of silica. The invention is also directed to the products so produced.

In the drawings

Figure 1 is a representation of an electron micrograph showing the growth of particles according to processes of the invention, and Figure 2 illustrates the necessity for the control of certain process features in a process like that of Figure 1, and Figure 3 is a similar illustration of a process like that of Figure 1, again showing the importance of certain process conditions hereinafter described.

Before describing the drawings in further detail it will be helpful first to describe the process conditions and manipulation.

*The starting sols for preparation of sols at temperatures below 300° C.*

Silica sols of unaggregated spheroidal particles of amorphous silica which are suitable for use according to the present invention should be substantially free from particles having a diameter less than 5 millimicrons. Such silica sols may be prepared by any prior art method which will yield sols having the characteristics more specifically described hereinafter.

A silica sol may be obtained by passing a sodium silicate solution in contact with an ion-exchange resin. Such a process is shown in the Bird Patent 2,244,325. A sol as directly prepared by ion-exchange is composed of silica particles which are ordinarily well below about 5 millimicrons in diameter. Such a sol and other similar sols prepared by prior art methods and which have such small diameter particles are quickly precipitated or coagulated by heat and pressure to form a gel. This will be further discussed hereinafter. They are, accordingly, unsuitable for use according to the present invention until further treated. A suitable treatment for increasing the particle size of such sols, which are relatively free from soluble salts, is to adjust the pH, if necessary, to within the range of pH 7 to 10.5 and thereafter to heat and age the sols until the particles are all above at least 5 millimicrons. The temperature of the heating will ordinarily range from about 60° C. to 160° C. although particle growth can be effected at even lower temperatures by aging the sols for a relatively long time.

Sols containing particles less than about 5 millimicrons can advantageously be heated as above described until the particles grow to about 12 millimicrons. In such a sol there will not be any substantial quantity of particles of less than 5 millimicrons. It is to be observed, however, that it will not ordinarily be practical to obtain a particle size substantially larger than about 12 millimicrons by heating at temperatures below about 160° C.

Sols which have particles above about 5 millimicrons and even which contain no substantial proportion of particles below this figure can advantageously be treated also by heating as described to increase the size up to about 12 millimicrons. The time used for the treatment will vary considerably with the temperature and with the exact character of the starting sol. Generally a time from about 1 to 30 minutes will be used under practical conditions. For example, a silica sol freshly prepared by ion-exchange and adjusted to pH 9 may be converted to a sol in which the particles are about 5 millimicrons in diameter by heating to a temperature of 100° C. for a period of about 1½ hours. Similarly, the sols can thereafter be caused to increase in particle size, depending upon the length of time and upon the temperature of pre-treatment.

It will be understood that in practical use of processes of the invention the sols will normally be heated from room temperature up to about 160° C. or some temperature not too far below this figure, and will be brought up to this temperature rather slowly. This will often be a sufficient pre-treatment of the sol if care is taken to allow time enough to be sure that there are substantially no particles present which are less than about 5 millimicrons in diameter.

If it is desired to use as starting materials silica sols which contain much larger particles than those which can readily be obtained as just described, then one may follow the process more fully set out by Max F. Bechtold and Omar E. Snyder in United States Patent No. 2,574,902.

Following the procedures of Bechtold and Snyder, sols may be prepared which are composed of unaggregated spheroidal particles of amorphous silica which are surprisingly uniform in size. Such silica sols are made by heating a silica sol prepared by ion-exchange, for example, as described in the Bird Patent 2,244,325, to a temperature above 60° C., stabilizing with an alkali, and adding further quantities of the same type of sol until at least 5 times as much silica has been added to the original quantity as was at first present. The product thus produced is stable against gelation at high temperatures and pressures and it contains discrete silica particles having a molecular weight as determined by light scattering of more than one-half million. The particle sizes are in excess of about 10 millimicrons and range upwardly to, say, about 150 millimicrons.

The particles of sol are quite dense and this may be shown by drying the particles and then determining the amount of nitrogen adsorption. From the nitrogen adsorption it may be determined that the particles have a surface area not greatly in access of that computed from the particle size as determined by electron micrographs. It will be evident that if the particles are not dense, but rather, are porous, then the apparent surface as determined by nitrogen adsorption will be much higher than that expected from the particle diameters. Nitrogen adsorption, accordingly, affords an easy measure of the density of the particles. The preferred sols for use as starting materials according to the present invention have particles of such density that the surface area as determined by nitrogen adsorption is not greatly in excess of that computed for the particle size as determined by examination of an electron micrograph and the adsorption should not be more than about 30 per cent greater than that computed from the apparent particle sizes. Unless the particles are relatively dense, sols more concentrated than 10 or 15 per cent $SiO_2$ by weight tend to gel when heated.

The method of determining the surface area by nitrogen adsorption is described in "A New Method for Measuring the Surface Areas of Finely Divided Materials and for Determining the Size of Particles" by P. H. Emmett in "Symposium on New Methods for Particle Size Determination in the Subsieve Range" in the Washington Spring Meeting of A. S. T. M., March 4, 1941.

While for some purposes of the invention the sols as produced by Bechtold and Snyder and having particles nearing the upper limit of colloidal dimensions may be used, it will be evident that when it is desired to prepare sols of larger particle size one will ordinarily use a starting sol which is composed of comparatively smaller particles. Thus, one may take a sol as prepared according to the Bechtold and Snyder process and containing particles of, say, 15 millimicrons or so in diameter, and instead of following the relatively slow process of Bechtold and Snyder, quickly convert the particles to the desired larger dimension, using processes of the present invention.

Instead of preparing the starting sol by the process of the Bird patent, the process of the Voorhees United States Patent 2,457,971 can be used. In this latter patent a silica sol of rather low $SiO_2:M_2O$ mol ratio is ion-exchanged to yield a sol of higher $SiO_2:M_2O$ mol ratio. Similarly, any other method of preparing a silica sol of low molecular weight can be used to prepare a sol which will then be used for the preparation of a sol containing larger particles.

It will be understood, for example, that silica sols may be prepared under carefully controlled conditions by the reaction of acid with sodium silicate. This type of process will be followed by removal of electrolytes as by dialysis or ion-exchange.

The sols to be used for the purposes now being considered must be composed of unaggregated spheroidal particles of amorphous silica. When it is said that the sols are unaggregated it is meant that the particles are present largely as discrete, separate, spheroidal units and have at the most only 2 or 3 units in close association. For example, such a sol should not contain particles of supercolloidal size, such as are formed by the aggregation of smaller silica units, nor should it contain dispersed gel fragments. Unaggregated sols will ordinarily contain at least a majority of the particles as unaggregated single spheroids when diluted with water and viewed with the electron microscope. Again, the total of single spheroids and particles which contain no more than 2 spheroids associated together should exceed about 70 per cent of the total number of particles.

The absence of aggregation in a starting sol suitable for use according to the present invention can most readily be determined by the use of the electron microscope. It is necessary to dilute the sol and take pictures at increasing dilutions until the fraction of particles which appear to be in contact with each other is no further reduced upon further dilution. This is necessary because a certain number of particles will appear to be in contact with each other by accident if they are too close together in the film after it is dried. By unaggregated, accordingly, it is meant for present purposes that at least a majority of the units in the starting sol (which contains no substantial amount of particles below 5 millimicrons) can be observed as single and discrete units.

When it is said that the starting sol contains no substantial amount of particles having a diameter less than 5 millimicrons it will be understood that this is equivalent to saying that the product is substantially free from soluble or ionic silica.

The determination of the presence of particles of less than 5 millimicrons presents some difficulty even with the ordinary electron microscope technique, although with careful manipulation, particles down to 2 millimicrons can be seen. If there is a question as to whether a particular sol contains any substantial amount of particles having a diameter less than 5 millimicrons, the sol can be heated to a temperature of 100° C. for a period of 4 hours at a pH of 9. This will assure the growth of any particles below 5 millimicrons to the size of above about 5 millimicrons. The sol thus produced and a sample of the original sol may be gelled by adjusting the pH to about 5.5 and warming, if necessary, to 50 or 60° C., then washing with dilute hydrochloric acid, distilled water, and propanol, then suspending the gel in propanol and removing water from the system by azeotropic distillation, then heating the anhydrous propanol suspension in an autoclave to above the critical point and releasing the propanol. The resulting aerogel is carefully ignited at gradually increasing temperatures up to about 500° C. and the resulting organic-free gel is characterized as to its surface area by nitrogen adsorption. An appreciable change, i. e., greater than 30 per cent decrease in the specific surface area of the gel, brought about by the heat treatment of the sol as just described indicates that the original sol contained particles smaller than about 5 millimicrons.

The concentration of the silica in the sol to be subjected to temperatures between about 160° C. and 300° C. according to the processes to be described below is important. If the concentration is too high, aggregation of the spheroidal units will occur instead of the desired particle growth. It is for this reason that in the case of sols having a particle size in the range from 5 to 12 millimicrons it is preferred to use sols having a concentration of from 2 to 10 per cent $SiO_2$, while if the particles have a size around 15 millimicrons, sols as high as 15 per cent may be employed under optimum conditions. Sols of larger particles may contain still larger amounts of silica without an undue amount of aggregation occurring during the heat treatment. The concentration may be stated as a rough rule of thumb by saying that the maximum concentration should not ordinarily exceed much more than a percentage of $SiO_2$ equal to the number average particle diameter expressed in millimicrons. Thus, roughly, a sol of 15 millimicron particles can contain up to about 15 per cent of $SiO_2$. It will further be understood that not more than about 40 per cent $SiO_2$ should be employed in suspensions or sols of even very large particles.

The lower limit on the concentration of the sol is a practical matter. The sols may be quite dilute, but it will not ordinarily be commercially economic to use sols containing less than about 2 per cent $SiO_2$ because silica is slightly soluble in water at elevated temperatures and pressures and it is not desired to dissolve appreciable fractions of the silica particles. It is obviously also undesirable to heat and handle large quantities of water unnecessarily.

In selecting sols of the types above described it will be understood, as has previously been indicated, that if the sols are not initially free or substantially free from electrolytes the sols should be suitably treated to remove them. This does not, of course, mean that the alkali metal oxide or hydroxide or other alkali which is used as a stabilizing agent should be removed. Reference is intended, however, rather to soluble salts such as sodium sulfate, chlorides, and the like which often appear in commercial sols. These may be removed, as previously indicated, if it is desired to use such a sol.

*The starting sols for silica suspensions prepared by heating above 300° C.*

The sols to be used for processes of this type are much less critical than for those to be used for the processes just described. The sols just described can be used to advantage but they may be considerably more aggregated without undue difficulty because of the greater extent of rearrangement of the silica structure at the higher temperatures.

The considerations as to particle size similarly are not so critical when the heating is to be above 300° C., and particles of a rather large size may be used. It is not even as critical that the sols be free of particles of less than 5 millimicrons. If such particles are present there will be some aggregation but the resulting aggregates will be rearranged under the conditions of the process to produce products of value.

The considerations as to concentration of a sol to be heated above 300° C. are similar to those previously described, though it will generally be desirable to use lower concentrations than have been discussed. For example, in making a product above 300° C. it is preferred to use sols containing no more than 10 or 15 per cent $SiO_2$ because of the tendency of silica to be deposited upon the walls of the heat-exchanger or other equipment used. Products obtained under these conditions are not nearly as likely to become aggregated, or to form gels, and thus the freedom from electrolytes is not quite as important as in the sols above described. It may even be desirable sometimes to employ small quantities of some electrolytes such as traces of sodium fluoride or sodium carbonate as catalysts.

Instead of the sols above-described, which are unaggregated and have uniform particle size, one may heat above 300° C. the somewhat dense and non-uniform type of product which can be made by precipitation of silica gel and redispersion with alkali. Such a process is described, for example, in the White Patent 2,375,738. The purity of such a product is not as easily controlled and for those applications of the invention in which extreme purity is desired they are less satisfactory than the sols previously mentioned.

The products prepared by redispersion of silica gel ordinarily have a good deal higher surface area as determined by nitrogen adsorption than would be indicated by calculation from the apparent particle diameter. This indicates considerable porosity.

*The process conditions for preparation of sols below 300° C.*

In a process for the preparation of a silica suspension, or more specifically a silica sol, of larger particles from a sol of smaller particles such as those which have already been described, the sol is heated to a temperature above about 160° C. and below about 300° C. More broadly, of course, it will be understood that the sols may be heated to any temperature above about 160° C. as hereinafter described to produce suspensions which will vary considerably in character. It seems convenient first to discuss those suspensions or sols which are produced below 300° C.

An aqueous sol of unaggregated spherodial particles of amorphous silica being susbtantially free of particles having a diameter of less than 5 millimicrons is adjusted, if necessary, to a pH of between 7 and 10.5. It will be remembered that in the pre-treatment to bring the particles to a size between, say, 5 and 12 millimicrons, the pH is adjusted to within the same range. It will not be necessary under most conditions to make a further adjustment of pH. However, the pH should be maintained within this range throughout the process to be described hereafter. It will be understood that the pH will be adjusted by the use of a soluble monovalent base such as sodium hydroxide, potassium hydroxide, or the like. If the pH is above the range indicated or is higher than is desired, it may be lowered most conveniently by treating the sol with the hydrogen form of a cation-exchange resin. If in this process an appreciable amount of ionic or low molecular weight silica is liberated, it should be converted to material of larger diameter than 5 millimicrons by heating the sol in the manner previously described before use in the process of this invention.

As has already been indicated, the process will be operated at a temperature above 160° C. and below about 300° C. for the preparation of sols of amorphous particles as now to be described. It is much preferred to use a temperature from about 200° to 300° C. because at the somewhat higher temperatures the process proceeds much more rapidly. When the sol is heated to these temperatures the pressure is maintained to avoid evaporation of water to such an extent that the silica will be more concentrated than is desired in the process. Generally, then, it may be said that the pressures used are those which correspond to the vapor pressure of water at the temperature used.

The time of treatment of a particular sol at the particular temperatures indicated will depend in large measure upon the character of the final sol desired. With longer treatments the sols are composed of larger and larger particles. It is to be observed that by using comparatively high temperature and short times it is possible to produce sols in which there is even less aggregation than in those produced at longer times or at lower temperatures. This will be shown further in the examples.

In processes of this invention and for practical operation the minimum time can be represented as at least $t$ minutes, where $$\log t = -9.1 + \frac{4600}{T}$$

where T is the temperature in degrees absolute. A heating time much shorter than that indicated by this expression does not give enough particle growth to be practical under most conditions of commercial use. For example, starting with a sol containing particles of about 6 millimicrons the time indicated for a given temperature of heating would lead to the production of sols having particles of around 12 to, say, 15 millimicrons. Ordinarily, sols of this type can be concentrated to make commercial sols of good stability and comparatively high concentration. However, for many purposes a sol of much larger particle size is desired in which case a considerably longer time may be used. Ordinarily it will not be desired to use a time much longer than about 30 minutes. If a suitable particle growth has not occurred at the temperature used, then rather than to extend the time of reaction it is preferred to increase the temperature. This follows because it is not desirable to tie up the pressure equipment needed for this type of reaction for any longer than is necessary and increasing the temperature is much more effective than increasing the time.

Processes of the invention can be carried out in conventional pressure equipment of any standard design. Particularly useful is the type of equipment which permits continuous operation by passing a sol through a comparatively small, heated reactor such as a pipe or tubular heat-exchanger. It will be especially observed that this continuous type of equipment is desirable when the times are very short, say, of the order of one minute or so.

Silica sols after heat treatment under the conditions described can be withdrawn from the pressure equipment in any desired fashion, either before or after cooling. Some of the heat of the solution can be recovered by flashing the water from the sol to effect concentration. It will be noted, however, that when very high temperatures are used, especially approaching 300° C., there is a small amount of silica dissolved in the water. In this event it is usually advantageous to cool the solution for the first 50-degree drop in temperature over a period of a few minutes rather than very rapidly in order to permit the dissolved silica to find its way back onto the colloidal particles.

The considerations as to the concentration of the sols to be heat-treated according to the process just described are the same as those already discussed in connection with the character of the starting sol. However, since the maximum concentration of silica in the sol being heated is related to the particle size of the silica spheroids present, provision may be made for partial concentration of the sol when it is part way through the heat treatment. In other words, the sol may be more concentrated at the later stages of its treatment and as the particles grow to larger sizes. The water may be removed, for instance, by flashing off a part of it at an intermediate point. Alternatively, the silica sol in a pressure vessel may have a comparatively concentrated silica sol added to it, thus raising the over-all concentration. For example, if it is desired to use a starting sol with an average particle diameter of about 7 millimicrons and containing about 15 per cent by weight of $SiO_2$, it is preferred not to treat this sol directly by passing it through a heat-exchanger to heat it to a maximum temperature. Instead it is preferred to establish a body of a portion of the sol which has been diluted and then to heat under pressure and at the temperature to be used, say, 250° C., and then to recirculate a portion of this sol and continuously add the 15 per cent sol to it. In this case the concentration in the circulating system would gradually be increased to 15 per cent and then the 15 per cent sol of larger particle size would be continuously withdrawn.

The importance of the conditions which have been described above and their effects can be better understood by reference to the accompanying drawings.

In Figure 1 there is illustrated a typical view of a starting sol which is unaggregated and is composed of spheroidal particles of amorphous silica and which is substantially free of particles having a diameter less than 5 millimicrons. Typical spheroidal particles such as the one designated I cover the field of the circle which represents the field of the electron microscope. It will be understood that all of the single particles shown are not of precisely the same size but that there is some variation. The sol illustrated is typical of those prepared by ion-exchange which have then been heated as previously described to assure the absence of particles smaller than 5 millimicrons.

In the field at the top of Figure 1 there is also shown an aggregate numbered 2 which shows two spheroidal particles which are in contact with each other. Most commercial silica sols will contain a few such aggregates even when they are carefully selected as previously described.

In Figure 1 the arrow represents the development of the sol illustrated in the first view. In the middle view particles 3 show the growth in size of the spheroidal particles of the original sol. Under the conditions of the invention as above described the particles will continue to be spheroidal and separate, with substantially no aggregation. An aggregate 4 is illustrated as an exception, showing that there is an occasional formation of aggregates.

The bottom view of Figure 1 illustrates the final condition of a sol prepared according to a process as previously described. This shows that the particles have grown to still larger dimensions and these are indicated by the numeral 5. In this bottom view there is illustrated an aggregate 6 which results from the aggregation of large particles. 7 is a more elongated particle which is still spheroidal and which results from the further growth and development of the aggregate 4. It is particularly to be noted that the aggregate 6 is not a shapeless mass of gel but rather retains the spheroidal character of the component units which have aggregated, and even when so aggregated they act pretty much as spheres. It is only when the aggregation becomes more severe and proceeds in three dimensions that there is a marked deleterious effect upon the character of the sol produced.

In Figure 2 there is shown the importance of maintaining the process conditions as previously discussed. In the top electron micrograph representation of this figure, there is shown a sol which is initially composed of spheroidal units which are aggregated into doublets 8, triplets 9, and still larger units 10. Such aggregation is very likely to occur if the pH of a silica sol is at any time reduced to the range of from 5 to 6, or if the sol is contaminated with small amounts of electrolytes or polyvalent metal salts. Such aggregates may form from sols also when the concentration of the sol exceeds the limits as heretofore discussed. For example, if a sol containing 6 millimicron particles is concentrated to 20 or 30 per cent $SiO_2$ and permitted to stand for a few days, aggregation of this type will occur.

Once particles at a given size have become aggregated as shown in this view they cannot become disaggregated by any conditions of heat, alkalinity or peptizing agents without at the same time dissolving a considerable number of the particles, and even then the resulting sol does not consist of completely unaggregated particles.

It will also be seen in the figure that a number of negative signs 11 are shown to indicate ionic silica or silica below about 5 millimicrons in diameter. The negative sign is used to indicate the charge, since the particles themselves will be too small to be visible under most circumstances.

Now if a mixture such as that shown in the top view of Figure 2 is heated under pressure the resulting product is that of the middle view. The aggregates are indicated by numerals 12, 13 and 14 as having increased in size. It will also be observed that they have begun to become shapeless due to a fusing together of the units. If a further quantity of ionic silica or silica particles of very small size 11 are added or remain from the first figure, and if the mixture is again heated or continues to be heated the sol will develop as shown in the bottom view of Figure 2. In this case there are a very few spheroidal units 15, and many units 16 and 17 made up of a plurality of particles. It will be observed that the individual units have become all but shapeless as a result of the process.

It will thus be understood that if the original sol is aggregated the final sol will be much more so. The importance, therefore, of using a starting sol of the type described will be evident. It will also be seen that the presence of particles of very small size or the presence of ionic silica promotes aggregation, especially if the pH is at any time allowed to fall through the range just below 7.

Figure 3 illustrates the importance of avoiding the presence of silica gel in the starting sol. In this figure a typical silica gel structure 18 is illustrated as occupying the entire field of the electron microscope. It will be understood that it is quite difficult to make a representation of a gel structure because of its three-dimensional character consisting of a network of particles of very small size. These are in some cases connected in chains so small as to appear to be like fibers even under the electron microscope. It is generally understood, however, that these gel structures are composed of very small spheroidal units 19 joined together in the manner illustrated.

If the silica gel is brought into a pH range as previously indicated and heated, there will be some disintegration of the gel, as shown in the middle figure. Apparently this is due to part of the gel structure passing into solution and simultaneously being deposited upon other parts of the gel structure. The resulting suspension contains highly aggregated chains of disintegrated gel 20.

As these fragments of the gel are subject to continued and further heating the fragments are filled out with silica so that they assume a more and more shapeless appearance with rounded contours following generally the configuration of the original fragments. These final particles are illustrated at 21 in the bottom view of Figure 3.

Thus it will be seen that it is most important that the starting sol have the character as previously described, since otherwise the resulting sol is not composed of uniform, spheroidal dense units.

The practical importance of the difference between the products as obtained in the three bottom views is that for sols of a given average particle size and silica content, the viscosity of a solution of the final product of Figure 1 will be much lower than that of the final products of Figures 2 and 3. It will be possible to concentrate the product of Figure 1 to a liquid, nongelled, stable suspension or sol having a very high solids content.

These sols are highly useful. The sols produced in accordance with the present invention, as in Figure 1, are valuable in the modification of waxes, rubber latex, adhesives, and in numerous other uses for which silica sols have been employed.

*The process conditions for the preparation of suspensions above 300° C.*

Very interesting sols can be prepared by heating for a short time, to a temperature above 300° C., one of the starting sols above-described under such extreme temperature and pressure conditions as will cause the particles to be converted at least partially to crystalline silica particles.

The considerations as to pH of the sol are similar to those above described but a somewhat higher pH can be used, and in fact is for many purposes preferable. The pH may go up as high as about pH 13, particularly after the sol has been subjected to extreme treatment. Actually, it will ordinarily be desirable to start with a sol having a pH from about 7 to around 11, but as a crystalline form of silica is formed the pH will rise due to the liberation of the free alkali, and it may reach 12 or 13.

The amount of alkali in the system should ordinarily be of the order of 1 per cent $Na_2O$ or less. There is no particular advantage in going to systems containing amounts of alkali much in excess of 1 per cent, since this concentration is adequate to provide for rapid formation of crystalline silica. Alkalis other than sodium hydroxide may be used; for example, hydroxides of lithium, or potassium or alkaline salts, such as sodium carbonate. Well-known mineralizing agents such as fluoride which tend to influence the character and rate of the crystals may be used if desired.

The formation of crystalline silica occurs at an appreciable rate above about 300° C., and it occurs rapidly at temperatures above about 400° C. Still higher temperatures may be used and pressures even above the critical may be used. As a practical matter a temperature much above about 550° C. will not be used.

Up to the critical the pressure will, of course, be that corresponding to the vapor pressure of water at the temperature used. At temperatures over the critical the pressure should be as high as practical. For example, with temperatures up to 550° C. a pressure of the order of 1000 atmospheres may be used.

The size of the crystalline silica particles in the resulting suspension will depend upon the time and temperature, but will be particularly dependent upon the time. It is preferred to keep the time as short as possible and thus to keep the velocity of flow of the suspension at a maximum in order to minimize attachment of the crystalline silica particles to the equipment.

The products produced by heating sols to temperatures above about 300° C. can vary from suspensions which contain particles in the colloidal range to suspensions containing particles up to about 1 micron, or even larger. The products produced can be used for impregnating paper, fiber, or cloth. Thus they may be used for the treating of unspun fibers of wool, cotton, or any of the synthetic fibers, such as rayon. The sols may be incorporated into various systems with which water is compatible, such as wax emulsions, waterbase paints, and other finishing and surfacing compositions. The suspensions which contain somewhat larger particles can be used as abrasives or as fine polishes. They may also be used as fillers for rubber plastics, and so forth. The suspensions can also be used for forming hard dense coatings in conjunction with small amounts of binders. They can also be used in minor amounts to fill the interstices between silica particles in cements or investment compounds.

The aqueous silica suspensions of dense, unaggregated silica particles produced by heating sols to elevated temperatures according to the invention have surfaces which are less reactive than is amorphous silica made at low temperatures. It has been observed, for example, that the products prepared at 300° C. and above contain particles which are quite clearly crystalline and this can be shown by X-ray diffraction or electron diffraction. At somewhat lower temperatures the tendency of the silica to orient on the surface of the particles to form micro-crystalline regions upon the surface of the spheroidal particles results in the particles being somewhat less reactive than amorphous silica which does not have this crystalline orientation.

In order that the invention may be better understood, the following illustrative examples are given in addition to the examples already described:

*Example 1*

For use in the process of this invention, a silica sol containing particles of silica between 5 and 10 millimicrons in diameter may be prepared as follows: Sodium silicate having an $SiO_2:Na_2O$ ratio of about 3.25 by weight, is diluted to give a solution containing 3 grams of $SiO_2$ per 100 milliliters. This solution is converted to polysilicic acid by passing it through a column of the hydrogen form of an ion-exchange resin which is a sulfonated crosslinked polystyrene. The effluent contains 3 per cent silicic acid or low molecular weight colloidal silica, having a pH of about 3, and being essentially free from sodium ions. Sufficient sodium hydroxide is then added to this solution to render it alkaline, giving an $SiO_2:Na_2O$ ratio of 85. The solution is then heated to 100° C. for 4 hours. This heat treatment converts essentially all of the ionic silica or soluble silica to colloidal particles larger than 5 millimicrons.

This sol is then used in the process of the present invention as follows: The sol is heated for 3.25 minutes at 270° C. in the following way: The sol is pumped under high pressure through a ⅛" inside diameter, stainless steel pipe, 150 feet long, immersed in a molten salt bath, and then immediately through a 1/16" inside diameter pipe, 9 feet long, surrounded by cooling water. Thermocouples in the line indicate that the temperature of the sol is 270° C. as it passes a few inches from the entrance of the pipe into the salt bath, and thereafter remains at the salt bath temperature until the exit is reached. The pressure on the system is maintained at above 1600 p. s. i. gauge at this temperature. At the outlet from the cooling zone the solution is permitted to flow through a needle valve which is so adjusted in conformity with the pumping rate that the desired pressure is maintained. By pumping more rapidly, and opening the release valve further so as to maintain the same pressure, it is possible to vary the flow rate through the heat-exchanger, and thus vary the time during which a given portion of sol is maintained at the desired temperature. In this particular experiment, the temperature was maintained at 270° C. for 3.25 minutes.

During the treatment, the pH of the sol increased from 7.2 to 9.5 and the particle size increased to about 15 millimicrons. Electron micrographs show that the particles in the effluent sol were quite uniform in size, the distribution of size being as follows:

| Diameter, millimicrons | 10 | 15 | 20 | 25 |
| --- | --- | --- | --- | --- |
| Percent of total no. of particles | 18.2 | 59.0 | 21.4 | 1.2 |

A comparison of this sol with one which has been merely heated in an autoclave at 160° C. for 3 hours to produce a sol of about this particle size, indicated that the particle size in the latter sol was less uniform.

| Diameter, millimicrons | 5 | 10 | 15 | 20 | 25 | 35 |
| --- | --- | --- | --- | --- | --- | --- |
| Percent of total no. of particles | 2.4 | 37.4 | 43.8 | 15.1 | 0.8 | 0.4 |

*Example 2*

A. A silica sol having a particle diameter of between 5 and 10 millimicrons, an $SiO_2$ content of 3 per cent by weight, and containing sufficient alkali to give an $SiO_2:Na_2O$ molar ratio of about 90 was heated in the manner described in Example 1 for 3.1 minutes at 200° C. It was then cooled immediately below 200° C. through the cooling coil and released from the system at a temperature below 100° C. The particles in the resulting sol had an average diameter of about 10 millimicrons, and a specific surface area of 271 m.²/g. The majority of the particles in the sol were separate, discrete spheres of relatively uniform size.

B. A sample of the original starting sol was heated for a period of 30 minutes at 160° C., and gave a sol having a particle diameter of about 12 millimicrons and a specific surface area of 290 m.²/g. Electron micrographs showed that the particles in the sol were more highly associated into aggregates or clusters containing from 3 up to as many as 4 or 5 particles each.

| Diameter of particles, mµ | 5 | 10 | 15 | 20 | 25 |
|---|---|---|---|---|---|
| Percent of total no. of particles: | | | | | |
| A | 6.7 | 60 | 27.7 | 5 | 0.2 |
| B | 8.0 | 61.9 | 23.8 | 5.5 | 0.8 |

| Percent of particles as | Singles | Doubles | Triplets | Multiples |
|---|---|---|---|---|
| A | 63 | 18 | 3 | 16 |
| B | 55 | 19 | 8 | 18 |

*Example 3*

A starting sol similar to that Example 1 was heated for 0.9 minute at 250° C. During this treatment, the pH increased from 8.5 to 9.4, and the resulting sol had an average particle diameter of about 15 millimicrons and a specific surface area of 225 m.²/g. The particle size was quite uniform, and the particles were not highly aggregated.

| Diameter of particles, mµ | 10 | 15 | 20 | 25 | 30 | 40 |
|---|---|---|---|---|---|---|
| Percent of total no. of particles | 23.6 | 62.2 | 9.5 | 3.8 | 0.5 | 0.2 |

| Percent of particles as | Singles | Doubles | Triplets | Multiples |
|---|---|---|---|---|
| | 72 | 16.7 | 5.4 | 5.9 |

The viscosity of this sol as measured at pH 10 and at a silica concentration of 10 grams of $SiO_2$ per 100 milliliters was only 1.12 centipoises at 25° C.

*Example 4*

The starting sol of Example 1 was heated for 10 minutes at a temperature of 200° C., giving an average particle diameter of about 12 millimicrons as measured by the electron microscope, and a specific surface area of 228 m.²/g. No large aggregates were present. The viscosity of this sol adjusted to pH 10 and at a silica concentration of 10 grams of $SiO_2$ per 100 milliliters was only 1.07 centipoises at 25° C.

| Diameter of particles, mµ | 7.5 | 10 | 12.5 | 15 | 17.5 | 20 |
|---|---|---|---|---|---|---|
| Percent of total no. of particles | 13.3 | 31.8 | 24.8 | 7.1 | 5.3 | 7.1 |

| Diameter of particles, mµ | 22.5 | 25 | 35 | 40 | 50 |
|---|---|---|---|---|---|
| Percent of total no. of particles | 1.8 | 2.6 | 1.8 | 2.6 | 1.8 |

| Percent of particles as | Singles | Doubles | Triplets | Multiples |
|---|---|---|---|---|
| | 55 | 23.4 | 7.6 | 14.0 |

*Example 5*

A. A starting sol similar to that used in Example 1 was heated for 10 minutes at 295° C. The particle size as determined from electron micrographs was about 46 millimicrons, and the specific surface area was 78 m.²/g. The particles consist of spheres or spheroids which were quite uniform in size and showed little aggregation.

B. A similar experiment, in which the temperature was maintained at 295° C. for 30 minutes gave a sol having an average particle size of about 64 millimicrons and a specific surface area of 62 m.²/g. However, this sol contained a small amount of larger particles, between 0.2 and 1.0 micron in size, consisting of a crystalline form of silica, along with the colloidal amorphous spheroidal silica particles. Silica also began to be deposited on the walls of the heating tube and eventually caused it to become plugged. It is concluded that at temperatures higher than about 300° C. for 30 minutes, at least with the amount of alkali present in this starting solution, particles of larger than colloidal size are formed. It is therefore preferred in making a sol of amorphous silica in accordance with the objectives of this invention, not to exceed a temperature of about 300° C. for a time of 30 minutes.

| Diameter of particles, mµ | 25 | 30 | 35 | 40 | 45 | 50 |
|---|---|---|---|---|---|---|
| Percent of total no. of particles: | | | | | | |
| A | 1.8 | 5.0 | 18.6 | 26.7 | 15.7 | 10.0 |
| B | | | 0.5 | 10.0 | 18.5 | 23.0 |

| Diameter of particles, mµ | 60 | 70 | 80 | 90 |
|---|---|---|---|---|
| Percent of total no. of particles: | | | | |
| A | 11.8 | 7.5 | 2.5 | 4 |
| B | 19.5 | 13.5 | 7.0 | 2.0 |

| Diameter of particles, mµ | 100 | 110 | 120 | 130 |
|---|---|---|---|---|
| Percent of total no. of particles: | | | | |
| A | | | | |
| B | 2.5 | 1.5 | 1.5 | 0.5 |

*Example 6*

As an example of the production of a sol of crystalline silica, a 4 per cent solution of pure colloidal silica essentially free from metal impurities except for enough sodium ion, as alkali, to give a pH of 8.0, is passed through a three-foot section of corrosion-resistant metal tubing having a one-eighth inch bore, at such a rate as to maintain a highly turbulent flow. The tube is heated in a furnace at 1000° C. The sol is preheated by passing it through a preheater vessel at about 360° C. which is just below the critical point, the pressure on the sol at this point being about 230 atmospheres. As the preheated sol passes out of the preheater and enters the small-bore tubing, the temperature exceeds the critical point so that the silica particles are in a gaseous medium. While it is not known what temperatures are reached by the silica particles, it must be much above 360° C., possibly 500-800° C. At the end of the small bore tubing the sol passes into a cooler to condense the water and silica, which then are permitted to emerge from an orifice. The sudden heat in presence of steam appears to promote crystallization of the colloidal particles so that they take on an angular appearance and give stronger X-ray interference lines than the silica in the original sol. The particle size ranges from 20 millimicrons to 1 micron in diameter depending on the heating time.

This application is a continuation-in-part of our application Serial No. 102,138, filed June 29, 1949, now abandoned.

We claim:

1. In a process for increasing the size of unaggregated silica particles in a silica suspension, the step comprising heating to a temperature of from 160 to 300° C. an aqueous sol of unaggregated, spheroidal, colloidal, amorphous silica particles which is substantially free from particles less than about 5 millimicrons in diameter and contains a sufficient amount of a monovalent base to give a pH of from 7 to 10.5 and is otherwise substantially electrolyte-free, the heating being continued until an increase in the size of the unaggregated silica particles has occurred.

2. In a process for increasing the size of unaggregated silica particles in a silica suspension, the step comprising heating at a temperature of from 200 to 300° C. an aqueous sol of unaggregated, spheroidal, colloidal, amorphous silica particles which is substantially free from particles less than about 5 millimicrons in diameter and contains a sufficient amount of a monovalent base to give a pH of from 7 to 10.5 and is otherwise substantially electrolyte-free, the heating being continued until an increase in the size of the unaggregated silica particles has occurred.

3. In a process for increasing the size of unaggregated silica particles in a silica suspension, the step comprising heating at a temperature of from 160 to 300° C. an aqueous sol of unaggregated, spheroidal, colloidal, amorphous silica particles which is substantially free from particles less than about 5 millimicrons in diameter and contains a sufficient amount of a monovalent base to give a pH of from 7 to 10.5 and is otherwise substantially electrolyte-free, the heating being continued for at least $t$ minutes, where $$\log t = -9.1 + \frac{4600}{T}$$

T being the temperature in degrees absolute.

4. In a process for increasing the size of unaggregated silica particles in a silica suspension, the step comprising heating at a temperature of from 200 to 300° C. an aqueous sol of unaggregated, spheroidal, colloidal, amorphous silica particles which is substantially free from particles less than about 5 millimicrons in diameter and contains a sufficient amount of a monovalent base to give a pH of from 7 to 10.5 and is otherwise substantially electrolyte-free, the heating being continued for at least $t$ minutes but not more than 30 minutes, where $$\log t = -9.1 + \frac{4600}{T}$$

T being the temperature in degrees absolute.

5. In a process for increasing the size of unaggregated silica particles in a silica suspension, the steps comprising heating at a temperature of from 60 to 160° C. an aqueous sol of unaggregated, spheroidal, colloidal, amorphous silica particles less than 12 millimicrons in diameter, the sol containing a sufficient amount of a monovalent base to give a pH of 7 to 10.5 and otherwise being substantially electrolyte-free, continuing the heating for from 1 to 30 minutes and at least until there are present substantially no particles of less than 5 millimicrons diameter, thereafter heating the sol at a temperature between 160 and 300° C. and a pH of 7 to 10.5 for at least $t$ minutes, where $$\log t = -9.1 + \frac{4600}{T}$$

T being the temperature in degrees absolute, the concentration of silica present during the second heating step being such that the percentage of silica by weight present in the sol is a number not substantially greater than the number average particle diameter, in millimicrons, of the silica particles.

References Cited in the file of this patent

UNITED STATES PATENTS

| Number | Name | Date |
|---|---|---|
| 2,574,902 | Bechtold et al. | Nov. 13, 1951 |